US011546570B2

(12) United States Patent
Taketani (10) Patent No.: US 11,546,570 B2
(45) Date of Patent: Jan. 3, 2023

(54) APPARATUS, APPARATUS CONTROL METHOD, AND RECORDING MEDIUM, FOR SYNCHRONIZING A PLURALITY OF IMAGING DEVICES

(71) Applicant: CANON KABUSHIKI KAISHA, Tokyo (JP)

(72) Inventor: Akihito Taketani, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/786,839

(22) Filed: Feb. 10, 2020

(65) Prior Publication Data
US 2020/0267372 A1 Aug. 20, 2020

(30) Foreign Application Priority Data
Feb. 18, 2019 (JP) .............................. JP2019-026499

(51) Int. Cl.
| H04N 13/239 | (2018.01) |
| G03B 35/08 | (2021.01) |
| H04N 5/04 | (2006.01) |
| H04N 13/296 | (2018.01) |
| H04N 5/353 | (2011.01) |
| H04N 13/106 | (2018.01) |

(52) U.S. Cl.
CPC ........... H04N 13/239 (2018.05); G03B 35/08 (2013.01); H04N 5/04 (2013.01); H04N 5/3532 (2013.01); H04N 13/106 (2018.05); H04N 13/296 (2018.05)

(58) Field of Classification Search
CPC ...... H04N 13/239; H04N 5/04; H04N 5/3532; H04N 13/106; H04N 13/296; H04N 5/247; H04N 5/23218; G03B 35/08
See application file for complete search history.

(56) References Cited

U.S. PATENT DOCUMENTS

| 2013/0010084 A1* | 1/2013 | Hatano | H04N 13/246 |
| | | | 348/47 |
| 2015/0271483 A1* | 9/2015 | Sun | G06K 9/52 |
| | | | 348/187 |
| 2019/0304116 A1* | 10/2019 | Price | G01B 11/22 |
| 2020/0084432 A1* | 3/2020 | Ravirala | H04N 13/239 |

FOREIGN PATENT DOCUMENTS

| JP | 2004032244 A | 1/2004 |
| JP | 2019102889 A | 6/2019 |
| WO | 2011132364 A1 | 10/2011 |
| WO | 2014/111814 A2 | 7/2014 |

* cited by examiner

Primary Examiner — Michael E Teitelbaum
(74) Attorney, Agent, or Firm — Canon U.S.A., Inc. IP Division (57) ABSTRACT

A synchronization control apparatus includes a control unit configured to control a plurality of imaging devices that capture an image, and a determination unit configured to determine a target region from which an image is acquired from each of the plurality of imaging devices, and to determine a synchronization signal corresponding to the target region in each of the plurality of imaging devices, wherein the determination unit determines the synchronization signal and the target region in each of the plurality of imaging devices so as to temporally synchronize images acquired from the plurality of imaging devices.

14 Claims, 8 Drawing Sheets

APPARATUS, APPARATUS CONTROL METHOD, AND RECORDING MEDIUM, FOR SYNCHRONIZING A PLURALITY OF IMAGING DEVICES

BACKGROUND

Field of the Disclosure

The present disclosure relates to a synchronization control technique for synchronizing image capturing timings in a plurality of imaging devices.

Description of the Related Art

In these days, a mixed reality (MR) technique and an augmented reality (AR) technique are known as techniques for seamlessly combining a real space and a virtual space in real time. As one of the techniques, a technique using a video see-through type head-mounted display (HMD) is known. In a system including a video see-through type HMD, a moving image of a real space that substantially matches a region observed from positions corresponding to the pupils of HMD wearer's eyes is captured by a video camera or the like, and a video image in which a computer graphics (CG) image is displayed in a superimposed manner on the captured moving image is displayed on an internal panel of the HMD. The HMD wearer observes the video image displayed on the internal panel of the HMD, thereby experiencing the augmented reality obtained by combining the real space and the virtual space.

In this case, an HMD often uses a plurality of image capturing units so that the position and orientation of the HMD can be identified by image processing and a video image corresponding to the position and orientation of the HMD can be observed by the HMD wearer. In addition, in the HMD system in which image processing is performed on a plurality of images captured by the plurality of image capturing units, if a synchronization deviation occurs among the plurality of captured images, the synchronization deviation causes an adverse effect on the image processing. In a case where rolling shutter type imaging devices are used as image sensors in the image capturing units, the image sensors that sequentially scan pixels have such a feature that signals are acquired from the respective pixels at different real times. Accordingly, in the case of using rolling shutter type image sensors, in addition to the synchronization for each captured image, countermeasures against a deviation between image capturing timings of the rolling shutter type image sensors needs to be taken.

For example, Japanese Patent Application Laid-Open No. 2004-32244 and International Patent Publication No. WO 2014/111814 discuss a technique in which image capturing timings are synchronized between a plurality of rolling shutter type image sensors so that the accuracy of ranging using an on-vehicle camera can be enhanced. In addition, International Patent Publication No. WO 2011/132364 discusses a technique for synchronizing image capturing timings among a plurality of rolling shutter type image sensors so that correction processing can be performed on a camera that presents a three-dimensional appearance to a user. In the techniques discussed in Japanese Patent Application Laid-Open No. 2004-32244, International Patent Publication No. WO 2014/111814, and International Patent Publication No. WO 2011/132364, a plurality of synchronization signals and a shutter speed or a scanning speed are adjusted for each captured image in an entire region of each of a plurality of image sensors, and the image capturing timings are finally synchronized in a region in which the images partially overlap each other.

However, in order to acquire an image of an overlapping portion that is required for image processing or the like in a subsequent stage of the HMD system, the HMD system captures an image in the entire region of each of the image sensors, transmits the captured image, and performs image processing on the image. Therefore, the HMD system is more likely to have a complicated and large structure and as well as large power consumption, which leads to inefficiency in processing to be performed by the HMD system.

SUMMARY OF THE DISCLOSURE

According to an aspect of the present disclosure, an apparatus that controls a plurality of imaging devices each configured to capture an image, each of the plurality of imaging devices being a rolling shutter type image sensor, includes a region determination unit configured to determine, in each of the plurality of imaging devices, a target region from which an image is acquired, and a signal determination unit configured to determine a synchronization signal corresponding to the determined target region, wherein the synchronization signal corresponds to a timing of starting image capturing in the target region in each of the plurality of imaging devices, the timing being determined so as to temporally synchronize a plurality of images acquired from the plurality of imaging devices.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the accompanying drawings. Configurations illustrated in the following exemplary embodiments are merely examples, and the present disclosure is not limited to the illustrated configurations.

In a first exemplary embodiment, an example is described in which a synchronization control apparatus according to the first exemplary embodiment is used for a head-mounted display (HMD) system including an HMD.

Figure 1:
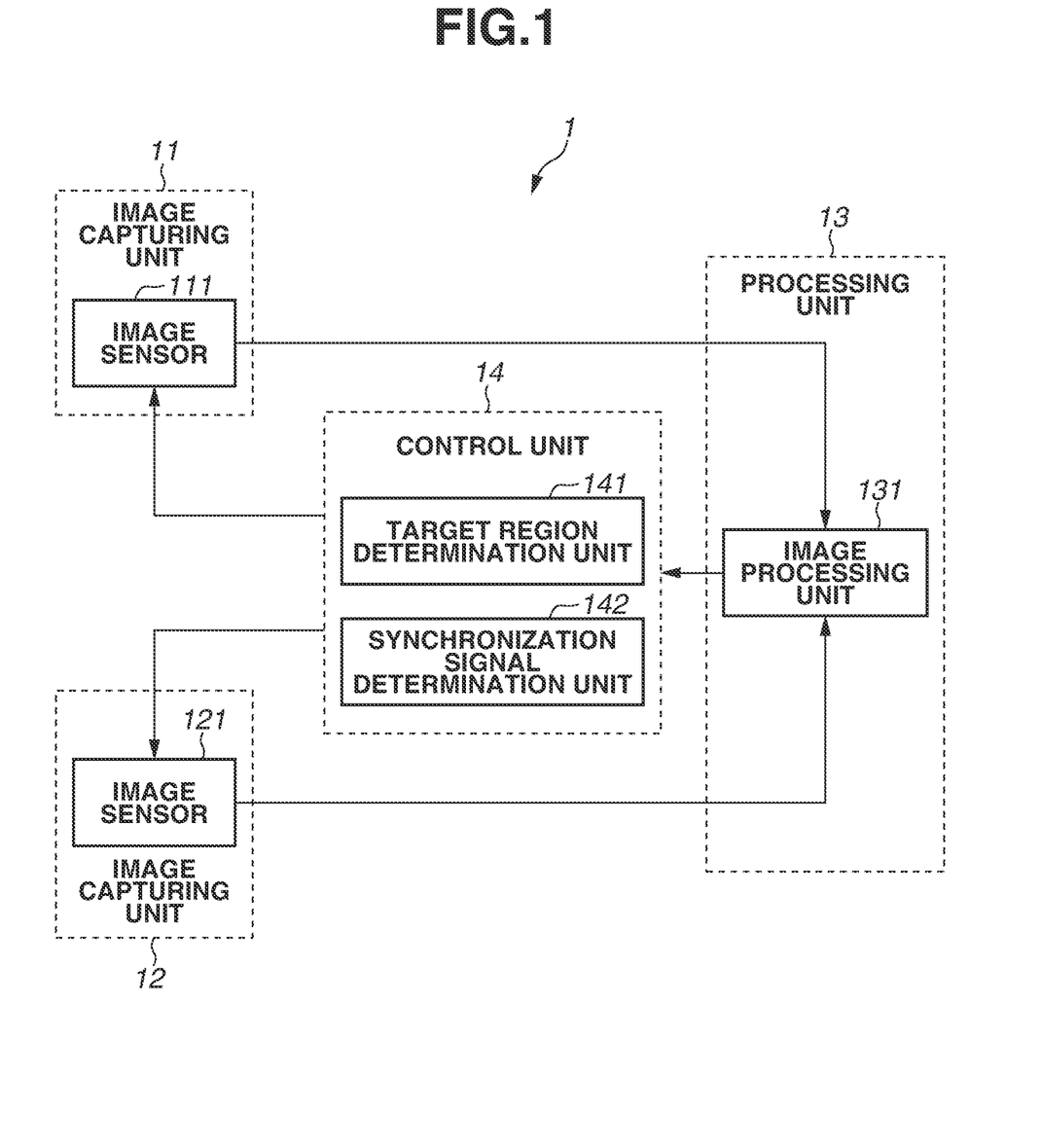
FIG. 1 is a block diagram illustrating a schematic configuration example of a head-mounted display (HMD) system, according to one or more aspect of the subject disclosure.

FIG. 1 is a block diagram schematically illustrating a configuration example of an HMD system 1 according to an exemplary embodiment of the present disclosure. The HMD system 1 includes an image capturing unit 11, an image capturing unit 12, a control unit 14, and a processing unit 13. The HMD worn on the head of a user may include all of these components, i.e., the image capturing unit 11, the image capturing unit 12, the control unit 14, and the processing unit 13. However, the HMD may include at least the image capturing unit 11 and the image capturing unit 12. In this case, the processing unit 13 and the control unit 14 are provided as separate units that are separated from the HMI), or are included in a mobile terminal, a personal computer, or the like and are connected to the HMD with a cable or via wireless communication.

In the configuration example illustrated in FIG. 1, assuming that so-called stereoscopic image capturing is performed, two image capturing units, i.e., the image capturing unit 11 and the image capturing unit 12, are provided. However, the number of image capturing units is not limited to two, and three, four, or more image capturing units may be provided. In the following description, an example is described in which the HMD includes the two image capturing units, i.e., the image capturing unit 11 and the image capturing unit 12. The image capturing unit 11 includes an image sensor 111, and the image capturing unit 12 includes an image sensor 121. In the present exemplary embodiment, assume that the image sensors 111 and 121 are rolling shutter type imaging devices. The image sensor 111 of the image capturing unit 11, the image sensor 121 of the image capturing unit 12, and an image capturing optical system are disposed in such a manner that image capturing is performed in the same region within each of an image capturing angle of view of the image capturing unit 11 and an image capturing angle of view of the image capturing unit 12 in an overlapping manner. Image data captured by the image sensor 111 and image data captured by the image sensor 121 are each transmitted to the processing unit 13. In the following description, image data to be transmitted is simply referred to as an image.

The processing unit 13 includes an image processing unit 131. The image processing unit 131 performs predetermined image processing on the images that are captured and transmitted by the image sensor 111 and the image sensor 121. The predetermined image processing includes calculation processing on a single image, such as Bayer interpolation and color correction, captured by each of the image sensors 111 and 121, ranging processing for calculating a distance from the HMD to an object based on a stereoscopic image obtained by stereoscopic image capturing, and calculation processing for combining a plurality of images. In the HMD system 1 according to the present exemplary embodiment, the image processing unit 131 also performs displacement amount detection processing for detecting a displacement amount of each of the plurality of images by calculations. The images on which the image processing is performed by the image processing unit 131 and information about the displacement amount of each of the images are transmitted to the control unit 14. Information about the distance obtained by ranging processing is used in second and third exemplary embodiments to be described below.

The control unit 14 includes a target region determination unit 141 and a synchronization signal determination unit 142.

The target region determination unit 141 determines a target region in each of the image sensors 111 and 121 based on the information about the displacement amount of each image detected by the image processing unit 131 and known specification information about the image sensors 111 and 121.

The target region corresponds to a region in Which an optical image of an object or the like present in the same region within each of the image capturing angle of view of the image capturing unit 11 and the image capturing angle of view of the image capturing unit 12 is formed. In other words, the target region corresponds to a region in which image capturing is performed in the same region within each of the image capturing angle of view of the image capturing unit 11 and the image capturing angle of view of the image capturing unit 12 in an overlapping manner. Typically, the target region is more likely to vary depending on the individual image sensor due to a mechanical structure, an assembly error, or the like of each image sensor. In other words, the position of the target region in an entire effective region in each of the image sensors 111 and 121 is more likely to vary depending on the individual image sensor due to the mechanical structure, the assembly error, or the like of each of the image sensors 111 and 121.

In this case, information about the amount of displacement caused by the mechanical structure, the assembly error, or the like of each of the image sensors 111 and 121, the direction of the displacement, and the like can be preliminarily acquired. Accordingly, the target region determination unit 141 can determine the target region by a calculation or the like based on the preliminarily acquired information. Information about the preliminarily determined target region is stored as region setting information in a memory. For example, at start-up of the HMD system 1, the target region determination unit 141 determines the target region in each of the image sensors 111 and 121 by loading the region setting information from the memory. The above-described processing in which information, such as preliminarily acquired information, is preliminarily stored in a memory and the information loaded from the memory is used is referred to as static processing in the present exemplary embodiment. The information about the amount of displacement caused by the mechanical structure, the assembly error, or the like of each of the image sensors 111 and 121 and the direction of the displacement can be acquired by a measurement, a calculation, or the like to be performed by another system using jigs and tools in a factory manufacturing process or the like. For example, the information about the amount of the displacement and the direction of the displacement can be acquired by, for example, calculating a difference between the mechanical structure and assembly initial values of each of the image sensors 111 and 121 calculated based on setting values set by the user or system design values, and positions acquired by actual measurements.

Alternatively, the target region determination unit 141 may determine the target region in each of the image sensors 111 and 121 by sequentially performing calculations using, for example, the information about the displacement amount of each image detected from a plurality of images through calculations by the image processing unit 131. For example, the target region determination unit 141 determines the target region based on a comparison between the information about the displacement amount of each of the images transmitted from the image processing unit 131 and the mechanical structure and assembly initial values of each of the image sensors 111 and 121 calculated based on setting values set by the user or system design values. The above-described processing in which desired information is obtained based on the comparison between the values sequentially calculated by the image processing and the initial values is referred to as dynamic processing in the present exemplary embodiment. In the case of determining the target region by dynamic processing, the information about the mechanical structure and assembly initial values of each of the image sensors 111 and 121 calculated based on the setting values set by the user or system design values is used as the region setting information when the target region is determined by calculations.

Further, the control unit 14 sets the target region determined for the image sensor 111 in the image sensor 111. Similarly, the control unit 14 sets the target region determined for the image sensor 121 in the image sensor 121.

The synchronization signal determination unit 142 determines a synchronization signal for each of the image sensors 111 and 121 based on the information about the displacement amount of each image calculated by the image processing unit 131, the specifications of the image sensors 111 and 121, and the target region determined by the target region determination unit 141.

In the present exemplary embodiment, the synchronization signal is a signal indicating at least an image capturing start timing in the target region set in each of the image sensors 111 and 121, and the synchronization signal can be determined by static processing or dynamic processing. In the case of static processing, the information indicating the preliminarily calculated synchronization signal is stored as synchronization setting information in a memory. For example, at a start-up of the HMD system 1, the synchronization signal determination unit 142 determines the synchronization signal for each of the image sensors 111 and 121 by loading the synchronization setting information from the memory. In the case of dynamic processing, the synchronization signal determination unit 142 acquires, as the synchronization setting information, the information about the displacement amount of each image calculated by the image processing unit 131 and the target region determination result obtained by the target region determination unit 141. Then, the synchronization signal determination unit 142 determines the synchronization signal for each of the image sensors 111 and 121 based on the synchronization setting information acquired by the dynamic processing. In the first exemplary embodiment, the synchronization signal determined for the image sensor 111 and the synchronization signal determined for the image sensor 121 are signals that take a value corresponding to a timing.

When the synchronization signal is determined, the control unit 14 generates various signals relating to an image capturing operation, such as a vertical synchronization signal and a horizontal synchronization signal, or a frame start signal and a reset signal, for each of the image sensors 111 and 121, based on the determined synchronization signal. Then, the control unit 14 transmits the various signals to the corresponding image sensor. The control unit 14 determines a cycle, voltage, and the like of the various signals relating to the image capturing operation based on the specifications and the like of the image sensors 111 and 121 and the HMD system 1.

Figure 2:
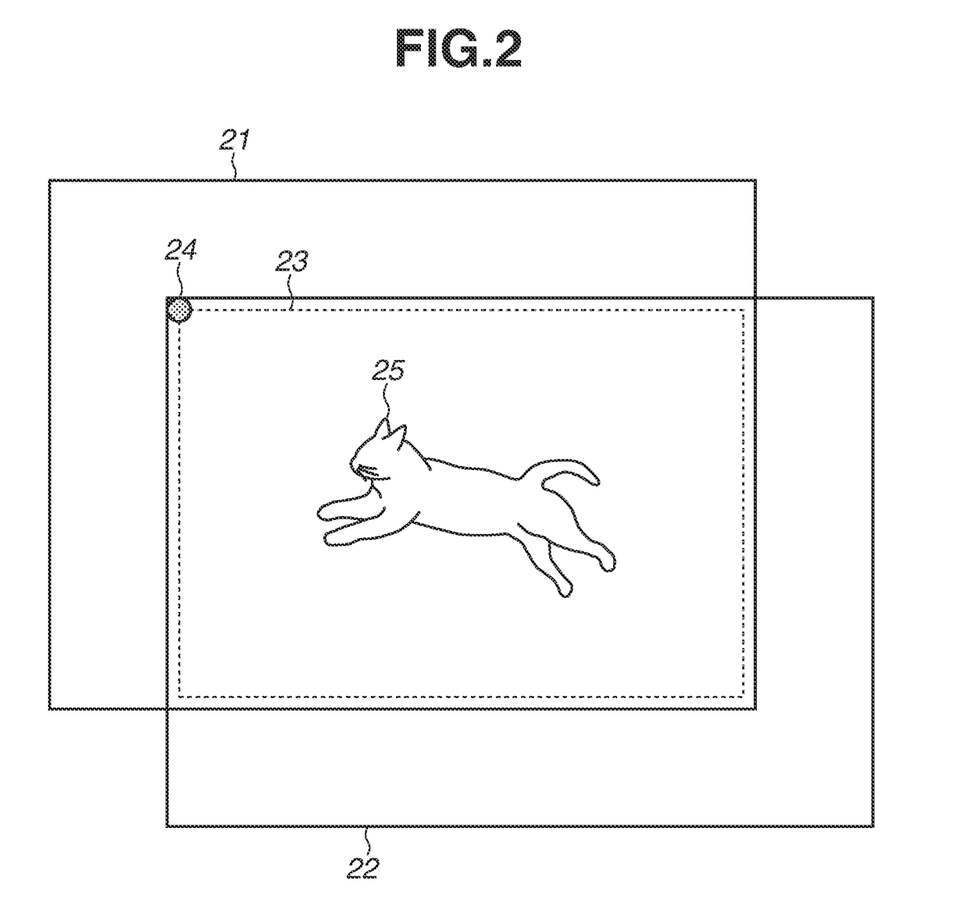
FIG. 2 is a conceptual diagram illustrating a target region and a synchronization position in each image sensor, according to one or more aspect of the subject disclosure.

FIG. 2 is a conceptual diagram illustrating an image capturing region in each of the image sensor 111 of the image capturing unit 11 and the image sensor 121 of the image capturing unit 12 according to the first exemplary embodiment.

The image sensors 111 and 121 are disposed in the HMD in such a manner that the image sensors 111 and 121 respectively correspond to left and right eyes of a user wearing the HMD (the user is hereinafter referred to as a wearer), and an optical image is formed on an image capturing plane of each of the image sensors 111 and 121 through the image capturing optical system (not illustrated). Typically, a layout relationship between the image sensor 111 in the image capturing unit 11 and the image capturing optical system does not completely match a layout relationship between die image sensor 121 in the image capturing unit 12 and the image capturing optical system due to the mechanical structure, the assembly error, or the like of each of the image sensors 111 and 121. If such a difference exists between the layout relationships, an optical image captured in an entire effective region 21 in the image sensor 111 and an optical image captured in an entire effective region 22 in the image sensor 121 are not accurately formed at the same position in the entire effective regions 21 and 22. For this reason, in the techniques discussed in Japanese Patent Application Laid-Open No. 2004-32244, international Patent Publication No. WO 2014/111814, and International Patent Publication No. WO 2011/132364, a synchronization signal and a shutter speed or a scanning speed is controlled for the entire effective region in each of a plurality of image sensors, and regions in which the same optical image is captured in the entire effective regions of the respective image sensors are temporally synchronized.

On the other hand, even when the layout relationship between the image sensor 111 and the image capturing optical system is slightly different from the layout relationship between the image sensor 121 and the image capturing optical system as described above, an overlapping region in which the same optical image is captured is present in each of the entire effective region 21 of the image sensor 111 and the entire effective region 22 of the image sensor 121.

Accordingly, in the present exemplary embodiment, the target region determination unit 141 of the control unit 14 determines, as a target region 23, an overlapping region in which the same optical image is captured in each of the entire effective region of the image sensor 111 and the entire effective region of the image sensor 121.

In an example illustrated in FIG. 2, the image sensor 111 and the image sensor 121 have such a layout relationship that the entire effective region 21 of the image sensor 111 is shifted in a diagonally lower right direction relatively to the entire effective region 22 of the image sensor 121. Accordingly, a lower-right region of the entire effective region 21 in the image sensor 111 corresponds to the target region 23, and an upper-left region of the entire effective region 22 in the image sensor 121 corresponds to the target region 23. In the present exemplary embodiment, the target region 23 is the target region from which a captured image is acquired.

In the case where the image sensors 111 and 121 are rolling shutter type imaging devices, pixels are sequentially scanned, for example, in order from an upper-left pixel to a rightmost pixel in a horizontal direction. Accordingly, an acquisition start position A11 of an image capturing signal in the image sensor 111 does not correspond to the upper-left pixel in the entire effective region 21, but corresponds to the upper-left pixel in the target region 23, i.e., a pixel located at a position shifted to a central portion in the entire effective region 21. On the other hand, an acquisition start position A12 of an image capturing signal in the image sensor 121 corresponds to the upper-left pixel in the target region 23, i.e., the upper-left pixel in the entire effective region 21 of the image sensor 121. In other words, the acquisition start positions A11 and A12 are different positions (A11≠A12) in the respective image sensors 111 and 121. The illustration of the acquisition start positions A11 and A12 is omitted.

Thus, in the present exemplary embodiment, the target region determination unit 141 of the control unit 14 determines the target region 23 in the image sensor 111 and the target region 23 in the image sensor 121 by calculations.

In addition, in the present exemplary embodiment, the synchronization signal determination unit 142 of the control unit 14 determines a synchronization position 24 to be a position where the target region 23 in the image sensor 111 is synchronized with the target region 23 in the image sensor 121.

Further, the control unit 14 controls the image capturing operation by causing the image sensors 111 and 121 to scan pixels from left to right in the horizontal direction with the synchronization position 24 in the target region 23 as a start point.

In the image sensors 111 and 121, pixels are scanned from the synchronization position 24 in the target region 23. Accordingly, an image of an object or the like is captured at the same timing in each pixel of the image sensors 111 and 121, so that a synchronized image can be acquired.

Although the target region 23 is smaller than the entire effective region of each of the image sensors 111 and 121, the target region 23 is large enough to capture an image including an object 25 or the like to be observed by the wearer. In the HMD system 1, images captured in the target region 23 can be transmitted with a minimum amount of transmitted data synchronized in real time, and the images can be processed with a minimum amount of processing synchronized in real time.

When the synchronization signal for the image sensor 111 is represented by V1 and the synchronization signal for the image sensor 121 is represented by V2, a match between the synchronization position 24 in the image sensor 111 and the synchronization position 24 in the image sensor 121 indicates that V1=V2. This indicates that since the synchronization signals used in the HMD system 1 may be identical as indicated by V1=V2 in the present exemplary embodiment, the HMD system 1 can be simplified.

Figure 3:
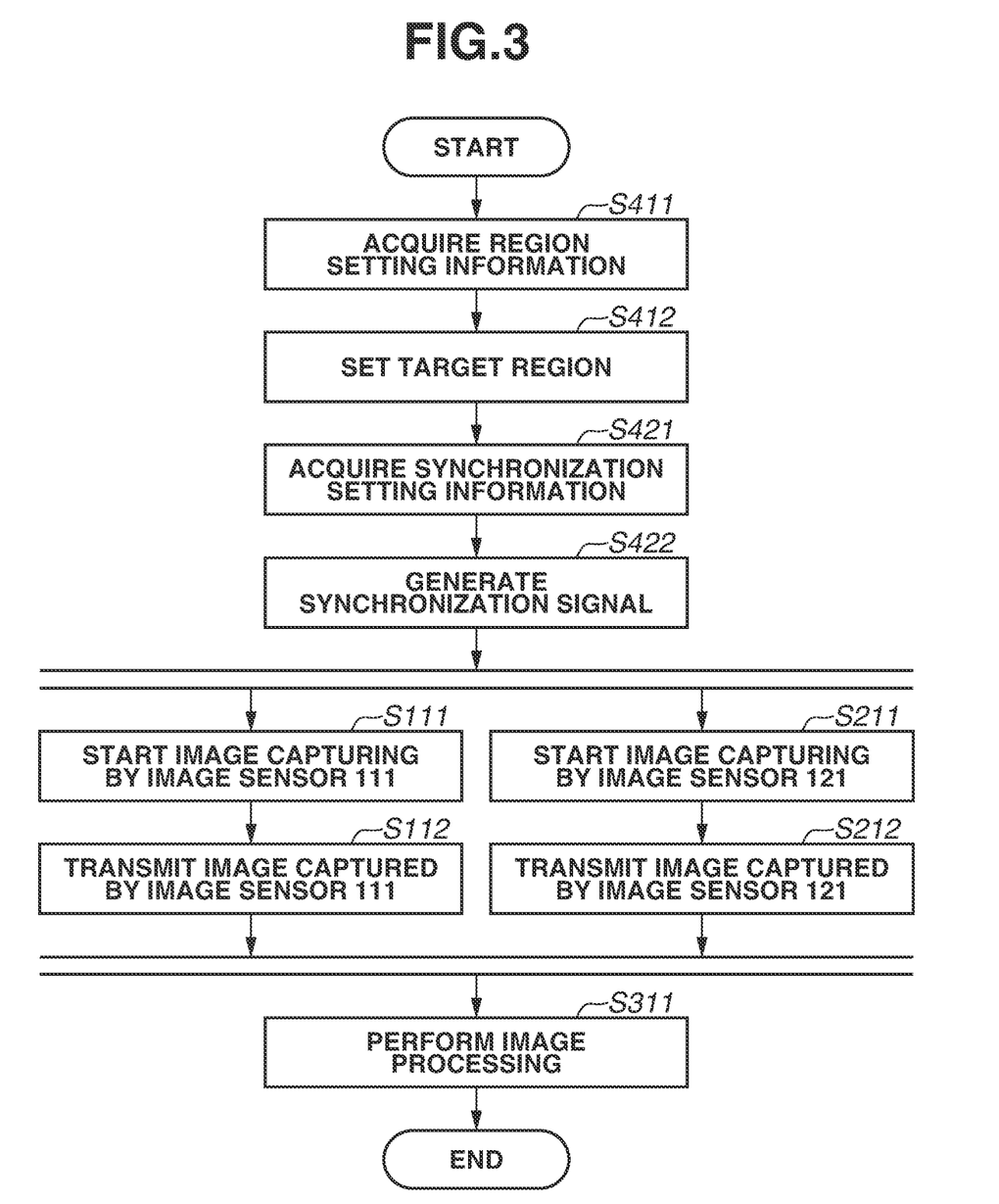
FIG. 3 is a flowchart illustrating a processing procedure according to one or more exemplary embodiment of the subject disclosure.

FIG. 3 is a flowchart illustrating a processing procedure from processing of determining the target region to image processing in the HMD system 1 according to the first exemplary embodiment.

First, in step S411, the target region determination unit 141 acquires the region setting information to be used for static processing based on the preliminarily obtained information as described above, or dynamic processing based on the information received from the image processing unit 131.

Next, in step S412, the control unit 14 determines the target region by static processing or dynamic processing based on the region setting information acquired by the target region determination unit 141 in step S411, and sets the target region in each of the image sensors 111 and 121. The target region is an overlapping region in which the image of the object 25 or the like can be captured by the image sensors 111 and 121 without causing a displacement as described above with reference to FIG. 2. In a case where the image sensors 111 and 121 are imaging devices that require a reset operation, the control unit 14 also executes the reset operation when the target region is set in step S412.

Next, in step S421, the synchronization signal determination unit 142 acquires the synchronization setting information to be used for static processing based on the preliminarily obtained information or dynamic processing based on the information received from the image processing unit 131 as described above.

Next, in step S422, the control unit 14 determines the synchronization signal based on the synchronization setting information acquired by the synchronization signal determination unit 142 in step S421. Further, the control unit 14 generates various signals relating to the image capturing operation, such as the vertical synchronization signal and the horizontal synchronization signal, or the frame start signal and the reset signal, for each of the image sensors 111 and 121, based on the synchronization signal. In the first exemplary embodiment, the synchronization signal determined in step S421 is the synchronization signal that takes the same value for each of the image sensors 111 and 121. Further, the control unit 14 outputs the various signals generated for each of the image sensors 111 and 121 to the corresponding image sensor.

After that, the image capturing unit 11 performs processing of steps S111 and S112 and the image capturing unit 12 performs processing of steps S211 and 212 based on the target region determined in step S412 and the synchronization signal determined in step S422. The processing of steps S111 and S112 and the processing of steps S211 and S212 are executed in parallel. Specifically, in the image capturing unit 11, image capturing is performed by the image sensor 111 in step S111, and the captured image is transmitted to the processing unit 13 in step S112. Similarly, in the image capturing unit 12, image capturing is performed by the image sensor 121 in step S211, and the captured image is transmitted to the processing unit 13 in step S212.

In the HMD system 1 according to the present exemplary embodiment, the image sensors 111 and 121 are driven by the various signals that are generated based on the same synchronization signal and are synchronized. Therefore, even when the shutter speed is changed by an exposure control operation, a temporally synchronized image is output from each pixel of the image sensors 111 and 121, as long as the same shutter speed is applied to the image sensors 111 and 121.

After that, the processing proceeds to step S311. In step S311, the image processing unit 131 performs predetermined image processing on the images transmitted from the image capturing units 11 and 12. In this way, in the present exemplary embodiment, the images captured by the image sensors 111 and 121 are synchronized images with no displacement. This enables the image processing unit 131 to perform image processing without causing a synchronization deviation.

Figure 4:
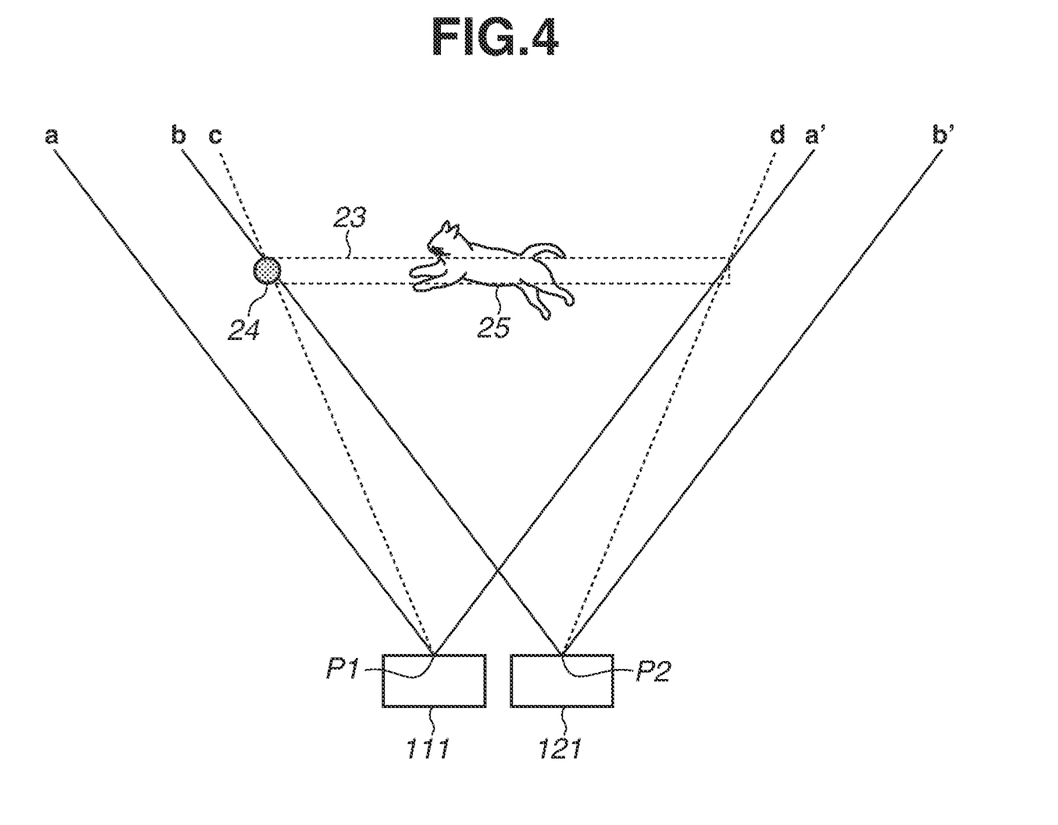
FIG. 4 is a diagram illustrating a positional relationship according to one or more exemplary embodiment of the subject disclosure.

FIG. 4 is a conceptual diagram illustrating a positional relationship between the image sensor 111, the image sensor 121, the object 25, the target region 23, and the synchronization position 24 according to the first exemplary embodiment. FIG. 4 is a conceptual diagram illustrating the object 25 and the image sensors 111 and 121 viewed from an upper side or a lower side with respect to the front side of each of the image sensors 111 and 121, while FIG. 2 is a conceptual diagram illustrating the object 25 viewed from a front side of each of the image sensors 111 and 121, Depending on the mechanical structure that can be employed by a plurality of images sensors, FIG. 4 can also be a conceptual diagram illustrating the object 25 and the image sensors 111 and 121 viewed from a left side or a right side with respect to the front side of each of the image sensors 111 and 121.

Assume that each of a line segment connecting a point p1 and a point a, a line segment connecting the point p1 and a point a', and a line segment connecting the point p1 and a point c on an image capturing plane of the image sensor 111 in FIG. 4 is a normal to an arc with the point p1 as a center. Similarly, assume that each of a line segment connecting a point p2 and a point b, a line segment connecting the point p2 and a point b', and a line segment connecting the point p2 and a point d on an image capturing plane of the image sensor 121 in FIG. 4 is a normal to an arc with the point p2 as a center. The line segment connecting the point p1 and the point a is hereinafter referred to as a normal a. The line segment connecting the point p1 and the point a' is hereinafter referred to as a normal a'. The line segment connecting the point p1 and the point c is hereinafter referred to as a normal c. The line segment connecting the point p2 and the point b is hereinafter referred to as a normal b. The line segment connecting the point p2 and the point b' is hereinafter referred to as a normal b'. The line segment connecting the point p2 and the point d is hereinafter referred to as a normal d. A region located between the normal a and the normal a' in the image sensor 111 illustrated in FIG. 4 corresponds to the image capturing angle of view of the image capturing unit 11. In the entire effective region 21 of the image sensor 111 illustrated in FIG. 2, an optical image of an object or the like within the image capturing angle of view of the image capturing unit 11 is formed. Similarly, a region located between the normal b and the normal b' in the image sensor 121 illustrated in FIG. 4 corresponds to the image capturing angle of view of the image capturing unit 12. In the entire effective region 22 of the image sensor 121 illustrated in FIG. 2, an optical image of an object or the like within the image capturing angle of view of the image capturing unit 12 is formed.

In the case of the image sensor 111, the target region 23 illustrated in FIG. 2 is a region in which an optical image within a region corresponding to an angle of view formed between the normal c and the normal a' is formed. Similarly, in the case of the image sensor 121, the target region 23 is a region in which an optical image within a region corresponding to an angle of view formed between the normal b and the normal d is formed. The synchronization position 24 in each of the image sensors 111 and 121 illustrated in FIG. 2 is a position that corresponds to a timing and is located on the normal c of the image sensor 111 and on the normal b of the image sensor 121. In practice, the target region 21 and the synchronization position 74 are set separately in the respective entire effective regions of the image sensors 111 and 121. However, to facilitate the illustration of the positional relationship in FIG. 4, the target region 23 and the synchronization position 24 are illustrated at the same position as the object 25 for convenience of explanation. That is the same for FIGS. 5 and 7 to be described below.

Assuming that the image sensors 111 and 121 are rolling shutter type imaging devices, in the target region 23 of each of the image sensors 111 and 121, scanning is performed from left to right in the horizontal direction with the synchronization position 24 as a start point. In this case, scanning is performed from the synchronization position 24 in the target region 23 of each of the image sensors 111 and 121 Accordingly, an image of an object or the like is captured at the same timing in each pixel of the image sensors 111 and 121. As a result, a synchronized image is acquired in the target region 23 of each of the image sensors 111 and 121.

According to the first exemplary embodiment, in the case where the image sensors 111 and 121 are rolling shutter type imaging devices, a temporally-synchronized captured image can be acquired in the target region that is an overlapping region between the image sensors 111 and 121.

Next, a second exemplary embodiment will be described. The configuration of the HMD system 1 according to the second exemplary embodiment is similar to that of the first exemplary embodiment, and thus the illustration and explanation thereof are omitted.

In an example illustrated in FIG. 4, if the object 25 is located close to the rolling shutter type image sensors, the temporal synchronization may not be achieved in each pixel in which the image of the object 25, which is located close to the image sensors, is captured.

Figure 5:
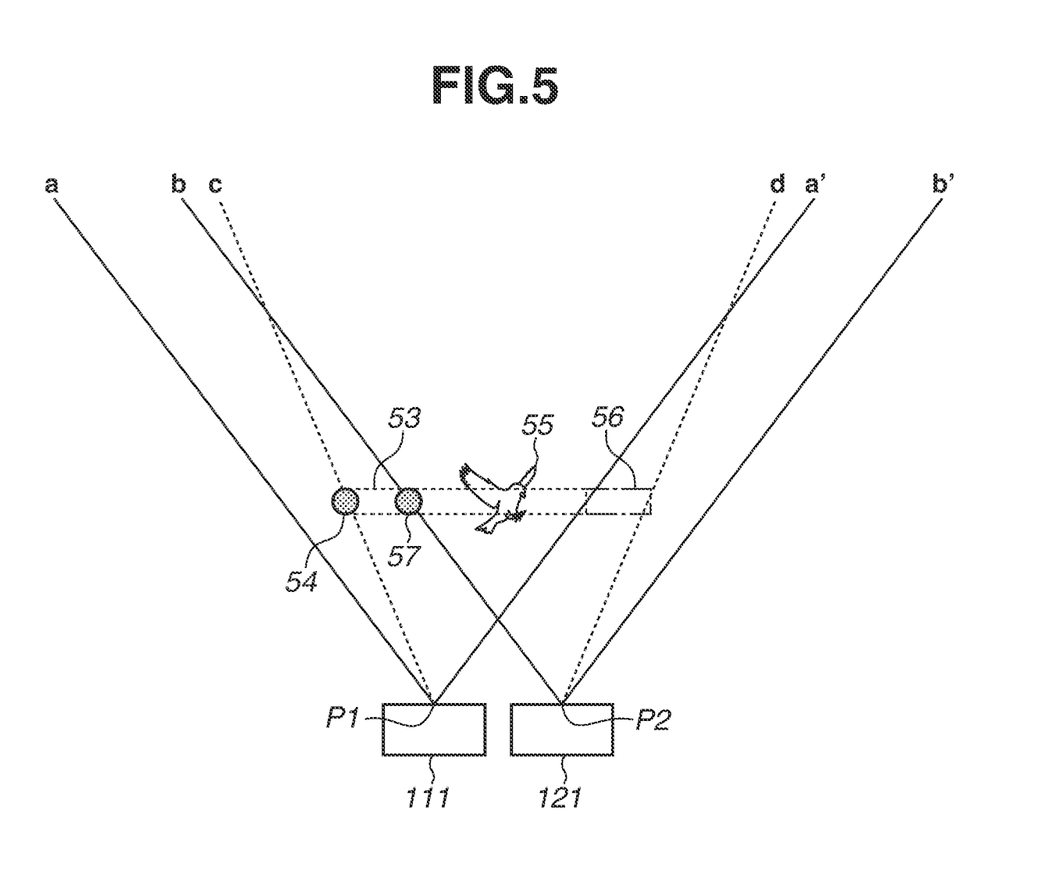
FIG. 5 is a diagram illustrating a positional relationship according to one or more exemplary embodiment of the subject disclosure.

FIG. 5 is a conceptual diagram illustrating a positional relationship between the image sensor 111, the image sensor 121, an object 55, the target region, and the synchronization position according to the second exemplary embodiment. The conceptual diagram illustrated in FIG. 5 is substantially similar to FIG. 4, except that the object 55 illustrated in the example of FIG. 5 is present at a position closer to the image sensors 111 and 121 than the object illustrated in the example of FIG. 4.

In the case of FIG. 5, like in the case of FIG. 4, the region located between the normal a and the normal a' corresponds to the image capturing angle of view of the image capturing unit 11, and an optical image of an object or the like within the image capturing angle of view of the image capturing unit 11 is formed in the entire effective region 21 of the image sensor 111. Similarly, the region located between the normal b and the normal b' corresponds to the image capturing angle of view of the image capturing unit 12, and an optical image of an object or the like within the image capturing angle of view of the image capturing unit 12 is formed in the entire effective region 22 of the image sensor 121.

As described in the first exemplary embodiment, the target region is determined to be a region in which image capturing is performed in the same region within each of the image capturing angle of view of the image capturing unit 11 and the image capturing angle of view of the image capturing unit 12 in an overlapping manner. More specifically, the target region in the image sensor 111 is determined to be a region corresponding to the angle of view formed between the normal c and the normal a', and the target region in the image sensor 121 is determined to be a region corresponding to the angle of view formed between the normal c and the normal a'. The synchronization position in the target region of the image sensor 111 and the synchronization position in the target region of the image sensor 121 are set to the same position.

However, if the object 55 is located at a position close to the image sensors 111 and 121, the position of the optical image of the object 55 in the image sensor 111 may be shifted from that in the image sensor 121 within the target region determined for each of the image sensors 111 and 121. More specifically, as illustrated in FIG. 5, the position of the optical image of the object 55 is shifted relatively to each of a target region 53 corresponding to the angle of view formed between the normal c and the normal a' and the target region 56 corresponding to an angle of view formed between the normal b and the normal d. Similarly, a synchronization position 54 in the target region 53 and a synchronization position 57 in the target region 56 are shifted relatively to the position of the optical image of the object 55.

In an example illustrated in FIG. 5, in consideration of the positional relationship between the target region 53 and the synchronization position 54, the target region 56 and the synchronization position 57, and the optical image of the object 55, the position of the optical image of the object 55 is located at a position closer to the synchronization position 57 than the synchronization position 54. In this case, pixels are scanned from left to right with the synchronization position 54 as a start point in the image sensor 111, which is a rolling shutter type image sensor, and pixels are scanned from left to right with the synchronization position 57 as a start point in the image sensor 121. Accordingly, like in the first exemplary embodiment, when the synchronization signals of the same timing are used, capturing of the optical image of the object 55 in the image sensor 121 is started earlier than that in the image sensor 111. As a result, in the example illustrated in FIG. 5, if the synchronization signal V1 of the image sensor 111 and the synchronization signal V2 of the image sensor 121 satisfy V1=V2, the synchronization between the image capturing timing of capturing the image of the object 55 in the image sensor 111 and the image capturing timing of capturing the image of the object 55 in the image sensor 121 is not established.

Accordingly, in the second exemplary embodiment, the control unit 14 adjusts a timing of starting image capturing in the image sensor 111 and a timing of starting image capturing in the image sensor 121, More specifically, the control unit 14 starts image capturing based on the synchronization signal V1 from the synchronization position 54 in the image sensor 111 that is disposed on the proceeding side in a scanning direction from the synchronization position (on the opposite side of the scanning direction). On the other hand, the control unit 14 synchronizes the image capturing start timing based on the synchronization signal V2 in the image sensor 121 with a timing at which the scanning position of the image sensor 111 reaches the position corresponding to the synchronization position 57 of the image sensor 121. In other words, the control unit 14 synchronizes the image capturing start timing with a timing at which the scanning position of the image sensor 111 reaches the position corresponding to the synchronization position 57, and controls the image sensor 121 to start image capturing from the synchronization position 57 based on the synchronization signal V2 As a result, the image capturing timing in each pixel of the image sensor 111 is temporally synchronized with the image capturing timing in each pixel of the image sensor 121 within a region located between the normal b and the normal a'.

More specifically, when a scanning time from the synchronization position 54 to the position corresponding to the synchronization position 57 is represented by $\Delta t$, the control unit 14 delays, by the time $\Delta t$, the timing for the image sensor 121 to start image capturing from the synchronization position 57 based on the synchronization signal V2. In other words, the control unit 14 performs a control operation to satisfy V2=V1+$\Delta t$. In this case, the time $\Delta t$ can be obtained based on the angle of view corresponding to the target region 53, the angle of view corresponding to the target region 56, the scanning speed, and the distance from each of the image sensors 111 and 121 to the object 55. The angle of view corresponding to the target region 53 in the image sensor 111, the angle of view corresponding to the target region 56 in the image sensor 121, and the scanning speed in each of the image sensors 111 and 121 are preliminarily obtained. Accordingly, the order of processing for calculating the time $\Delta t$ varies depending on how the distance from each of the image sensors 111 and 121 to the object 55 is obtained. For example, in the image processing unit 131, distances are sequentially calculated based on a plurality of pieces of image information, and the time $\Delta t$ can be calculated by dynamic processing using the distance information and information about the preliminarily obtained angle of view and scanning speed. Alternatively, static processing may be performed by, for example, preliminarily storing a correspondence table or the like indicating the correspondence between the distance and the time $\Delta t$ in a memory, loading information about the correspondence table from the memory at a start-up of the HMD system 1, and acquiring the time $\Delta t$ based on the distance to the object 55. The information about the table used in the static processing is preliminarily derived based on initial values set by the HMD system 1, or a desired distance from each of the image sensors 111 and 121 to the object, and the information is stored in the memory.

Figure 6:
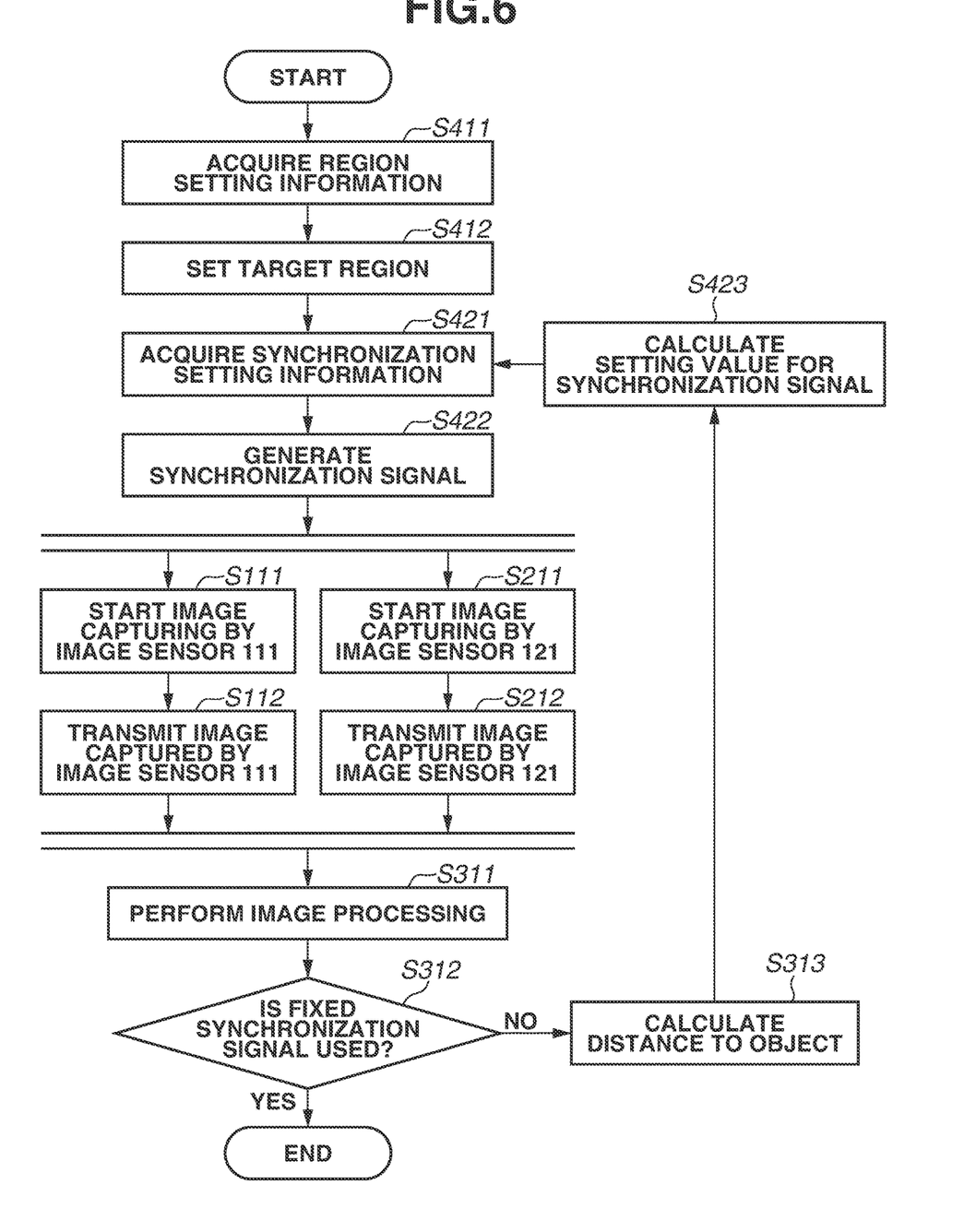
FIG. 6 is a flowchart illustrating a processing procedure according to one or more exemplary embodiment of the subject disclosure.

FIG. 6 is a flowchart illustrating a processing procedure from processing of determining the target region to image processing in the HMD system 1 according to the second exemplary embodiment. Steps S411 and S412 illustrated in FIG. 6 are respectively similar to steps S411 and S412 illustrated in FIG. 3, and steps S422 to S311 illustrated in FIG. 6 are respectively similar to steps S422 to S311 illustrated in FIG. 3, and thus descriptions thereof are omitted.

In step S421 in FIG. 6, the synchronization signal determination unit 142 of the control unit 14 acquires the synchronization setting information. In this case, the synchronization signal determination unit 142 acquires the synchronization setting information by static processing of loading information, such as a correspondence table, which is preliminarily calculated and stored, from the memory. Alternatively, the synchronization signal determination unit 142 acquires the synchronization setting information by dynamic processing based on the distance information sequentially calculated by the image processing unit 131 in the same manner as in the first exemplary embodiment.

After completing the processing in step S311, in step S312, the control unit 14 determines which one of a fixed static synchronization signal and a fluctuating dynamic synchronization signal is used. In other words, the control unit 14 determines whether, for example, the fixed synchronization signal determined as illustrated in FIG. 4 can be used, or whether the synchronization signal fluctuating depending on the distance is used. If it is determined that the fixed synchronization signal can be used (YES in step S312), the control unit 14 terminates the processing of the flowchart illustrated in FIG. 6, because the HMD system 1 only needs to constantly acquire images from the image sensors 111 and 121 using the same synchronization signal.

On the other hand, if it is not desirable to use the fixed synchronization signal (NO in step S312), the processing proceeds to step S313. In step S313, the control unit 14 acquires the distance from each of the image sensors 111 and 121 to the object 55. The distance is calculated by the image processing unit 131. If the object 55 is located at a position closer to the image sensors 111 and 121 than a certain reference point, there is a possibility that the image capturing timing of capturing the image of the object 55 in the image sensor 111 may not be synchronized with the image capturing timing of capturing the image of the object 55 in the image sensor 121. For this reason, in step S313, the image processing unit 131 performs processing for calculating the accurate distance to the object 55 based on a plurality of images. More specifically, the image processing unit 131 performs a calculation for estimating the distance from each of the image sensors 111 and 121 to the object 55 based on the displacement amount of each of a plurality of images including the object 55. The processing for obtaining the accurate distance based on the plurality of images often requires a lot of time. Assume that the image processing unit 131 has a performance capable of performing a calculation for estimating the distance at a high speed so that the images can be rapidly synchronized even when, for example, the object rapidly moves.

Next, in step S423, the control unit 14 calculates a setting value indicating how much the synchronization signal is shifted for each of the image sensors 111 and 121, In this case, the control unit 14 calculates a setting value for shifting the synchronization signal based on the distance to the object, the angle of view corresponding to the target region in each of the image sensors 111 and 121, and the scanning speed of each of the image sensors 111 and 121. After step S423, the processing returns to step S421 to be executed by the synchronization signal determination unit 142.

In step S421, the synchronization signal determination unit 142 sets the synchronization setting information for each of the image sensors 111 and 121 based on the setting value calculated in step S423. As a result, the synchronization signal to be determined in the subsequent step S422 becomes a synchronization signal that can provide temporal synchronization between the image capturing time in each pixel of the image sensor 111 and the image capturing time in each pixel of the image sensor 121.

As described above, according to the second exemplary embodiment, even in a case where, for example, the object has moved to a position close to the image sensors 111 and 121, captured images of the object can be temporally synchronized.

Next, a third exemplary embodiment will be described.

In the second exemplary embodiment, the synchronization signals of the same timing may be used for each of the image sensors 111 and 121, but in some cases, synchronization signals of different timings need to be used for the image sensors 111 and 121. Specifically, if the object is spaced apart to some extent from the image sensors 111 and 121, the image sensors 111 and 121 only need to use the synchronization signals of the same timing. However, if the object is located close to the image sensors 111 and 121, the image sensors 111 and 121 need to use synchronization signals of different timings. In this case, two synchronization signal lines may be required.

Accordingly, in the third exemplary embodiment, an example is described in which there is no need to generate synchronization signals of different timings. The configuration of the HMD system 1 according to the third exemplary embodiment is similar to that illustrated in FIG. 1, and thus the illustration and explanation thereof are omitted, FIG. 7 is a conceptual diagram illustrating a positional relationship between the image sensor 111, the image sensor 121, the object. 55, the target region, and the synchronization position according to the third exemplary embodiment.

Figure 7:
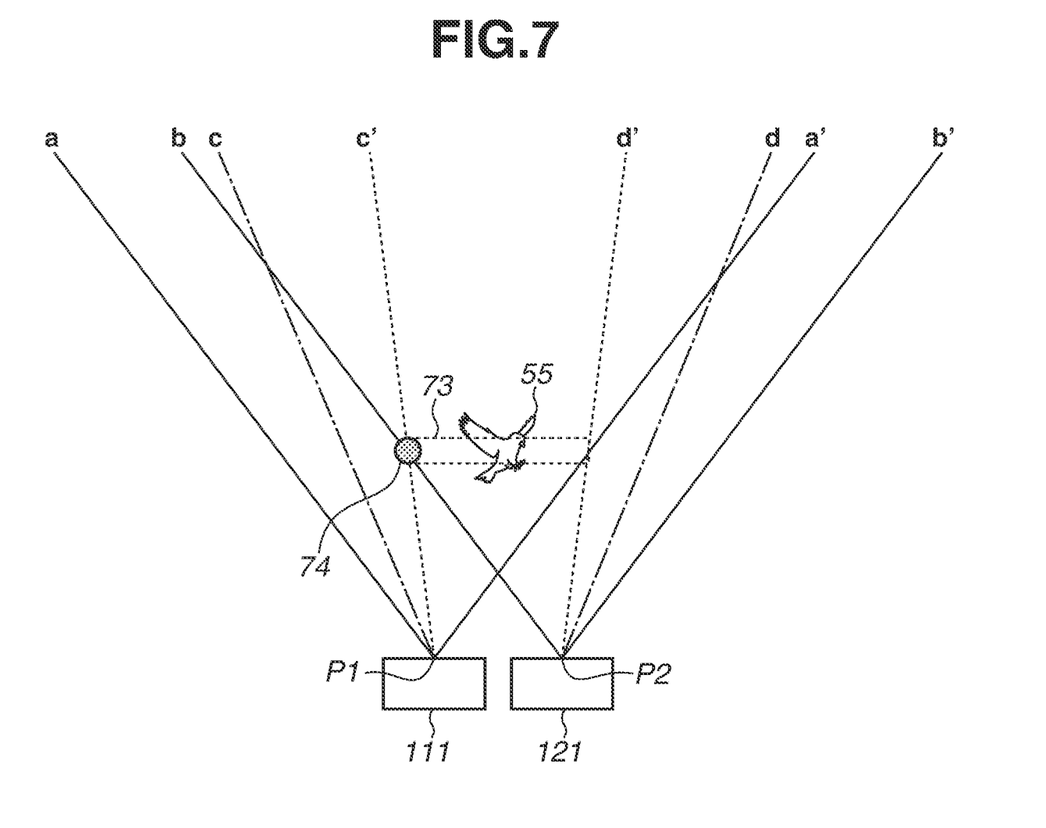
FIG. 7 is a diagram illustrating a positional relationship according to one or more exemplary embodiment of the subject disclosure.

In the case of FIG. 7, like in the case of FIG. 4, the region located between the normal a and the normal a' corresponds to the image capturing angle of view of the image capturing unit 11, and the region located between the normal b and the normal b' corresponds to the image capturing angle of view of the image capturing unit 12. In the third exemplary embodiment, like in the second exemplary embodiment, the object 55 is present at a position close to the image sensors 111 and 121.

In the third exemplary embodiment, in the case of determining the target region, information about the distance from each of the image sensors 111 and 121 to the object 55 is used. More specifically, the target region determination unit 141 first determines the target region for each of the image sensors 111 and 121 obtained in the same manner as in the first exemplary embodiment as a target region before adjustment. The image processing unit 131 calculates the distance from each of the image sensors 111 and 121 to the object 55 based on information about a plurality of images in the same manner as in the second exemplary embodiment. Further, the target region determination unit 141 calculates a setting value indicating how much the target region before adjustment for each of the image sensors 111 and 121 is changed based on the information about the distance calculated by the image processing unit 131. Then, the target region determination unit 141 adjusts the position, size, and the like of the target region before adjustment for each of the image sensors 111 and 121 based on the setting value, and determines the adjusted target region to be a target region corresponding to the distance to the object. The synchronization position of the target region in the image sensor 111 and the synchronization position of the target region in the image sensor 121 are set to the same position.

In the third exemplary embodiment, an adjusted target region 73 in the image sensor 111 is determined to be the region corresponding to the angle of view formed between a line segment connecting the point p1 and a point c' (the line segment is hereinafter referred to as a normal c') and the normal a' as illustrated in FIG. 7. Similarly, the adjusted target region 73 in the image sensor 121 is determined to be the region corresponding to the angle of view formed between a line segment connecting the point p2 and a point d' (the line segment is hereinafter referred to as a normal d') and the normal b. In other words, the adjusted target region 73 is a region in which the optical image of the object 55 is formed at the same position in each of the image sensors 111 and 121. The normal c indicated by a dashed-dotted line in FIG. 7 indicates the normal c illustrated in FIG. 4, and the normal d indicated by a dashed-dotted line in FIG. 7 indicates the normal d illustrated in FIG. 4. In the case of FIG. 7, the angle of view corresponding to the adjusted target region 73 of the image sensor 111 is narrowed by an amount corresponding to an angle formed between the normal c, which is indicated by the dashed-dotted line in FIG. 7, and the normal c'. Similarly, in the case of FIG. 7, the angle of view corresponding to the adjusted target region 73 of the image sensor 121 is narrowed by an amount corresponding to an angle formed between the normal d, which is indicated by a dashed-dotted line in FIG. 7, and the normal d'. A synchronization position 74 of each of the image sensors 111 and 121 is a position corresponding to a same timing on the line segment of the normal c' in the image sensor 111 and on the normal b in the image sensor 121.

Also, in the third exemplary embodiment, the image sensors 111 and 121 are rolling shutter type imaging devices and scan pixels from left to right in the horizontal direction with the synchronization position 74 as a start point in the target region 73. The target region 73 in each of the image sensors 111 and 121 is a region in which the optical image of the object 55 is formed at the same position. The synchronization position 74 in the image sensor 111 and the synchronization position 74 in the image sensor 121 are set to the same position. Accordingly, if the synchronization signal V1 of the image sensor 111 and the synchronization signal V2 of the image sensor 121 satisfy V1=V2, the image capturing time of capturing the image of the object 55 in the image sensor 111 is synchronized with the image capturing time of capturing the image of the object 55 in the image sensor 121. Thus, in the third exemplary embodiment, synchronization signals of different timings are not required even when the distance from each of the image sensors 111 and 121 to the object 55 is changed.

In the third exemplary embodiment, the adjusted target region 73 in each of the image sensors 111 and 121 is determined based on the distance from each of the image sensors 111 and 121 to the object 55. Accordingly, the order of processing for determining the target region varies depending on how the distance is obtained. More specifically, the target region may be determined by static processing in which, for example, information about a correspondence table indicating the correspondence between the setting value and the distance to be used when the target region is changed is stored in a memory, and the information is loaded from the memory at a start-up time of the HMD system 1. Alternatively, the target region may be determined by dynamic processing in which the image processing unit 131 sequentially calculates distances based on image information, and the setting value to be used when the target region is changed is obtained based on the information about the calculated distances.

Figure 8:
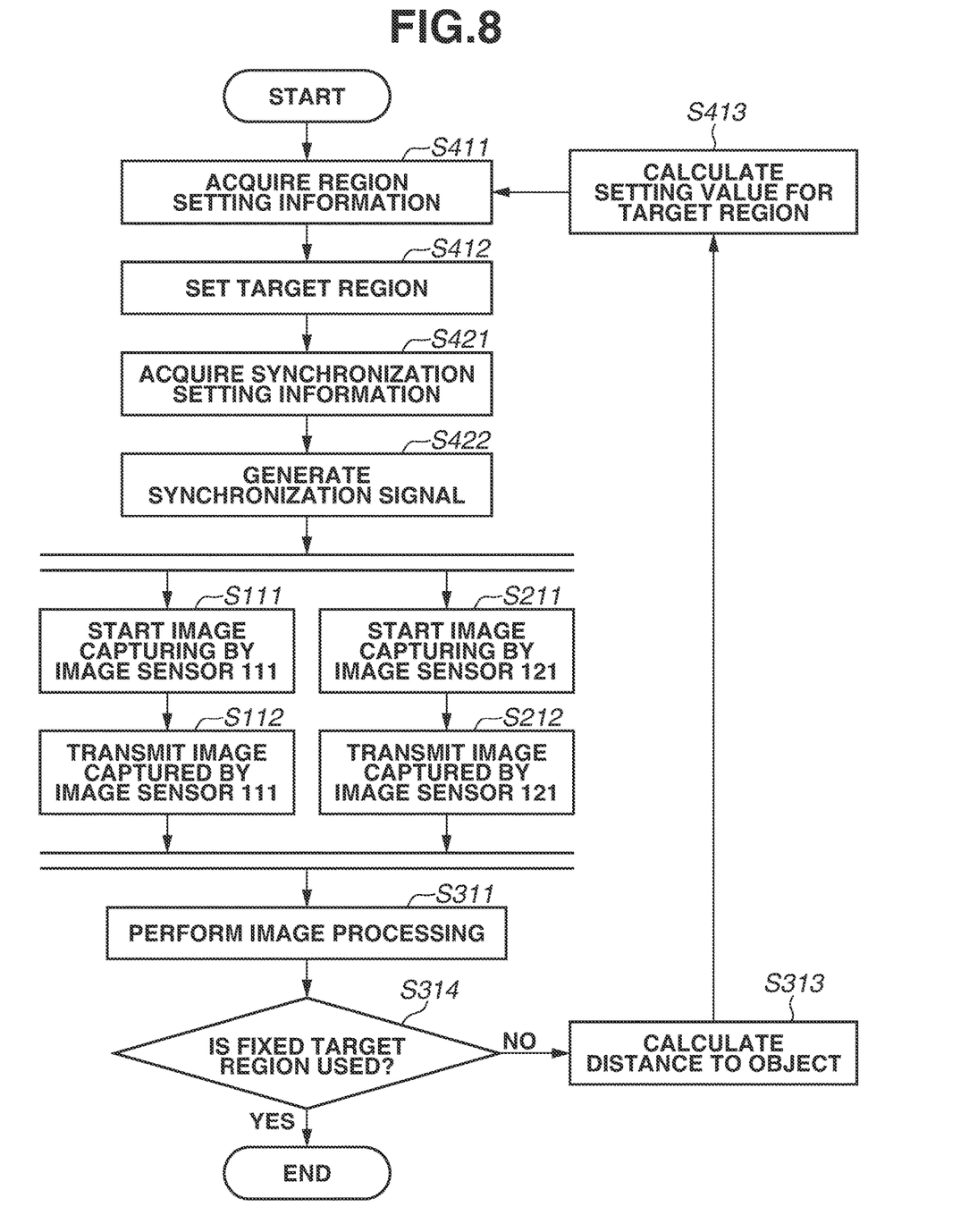
FIG. 8 is a flowchart illustrating a processing procedure according to one or more exemplary embodiment of the subject disclosure.

FIG. 8 is a flowchart illustrating a processing procedure from processing of determining the target region to image processing in the HMD system 1 according to the third exemplary embodiment. Processing in steps S412 to S311 illustrated in FIG. 8 is similar to processing in steps S412 to S311 illustrated in FIG. 3, and the processing in step S313 illustrated in FIG. 8 is similar to the processing in step S313 illustrated in FIG. 6, and thus descriptions thereof are omitted.

In step S411 illustrated in FIG. 8, the target region determination unit 141 first acquires the region setting information, like in step S411 illustrated in FIG. 3.

After completion of the processing in step S311, the processing proceeds to step S314. In step S314, the control unit 14 determines whether the target region before adjustment is directly used as the fixed target region or the fluctuating target region is used depending on the distance. In other words, the control unit 14 determines whether the fixed target region before adjustment can be used or the fluctuating target region is used depending on the distance based on, for example, the information about the distance calculated by the image processing unit 131. If it is determined that the fixed target region before adjustment can be used (YES in step S314), the control unit 14 terminates the processing of the flowchart illustrated in FIG. 8, because the system 1 may constantly acquire images from the image sensors 111 and 121 in the same target region. On the other hand, if it is determined that the object is located close to the image sensors 111 and 121 and thus it is not desirable to use the fixed target region before adjustment (NO in step S314), the processing returns to step S313. In step S313, the control unit 14 acquires the information about the distance calculated by the image processing unit 131.

After that, in step S413, the control unit 14 calculates a setting value indicating how much the target region for each of the image sensors 111 and 121 is changed based on the information about the distance obtained in step S313. Then, the processing returns to step S411.

In step S411, the target region determination unit 141 uses the setting value to determine the adjusted target region for each of the image sensors 111 and 121.

According to the third exemplary embodiment, it is possible to determine the target region from which a synchronized image can be acquired in each of the image sensors 111 and 121, without the need for generating synchronization signals of different timings even when the distance from each of the image sensors 111 and 121 to the object is changed.

In the second exemplary embodiment, the synchronization signal is adjusted based on the distance, and in the third exemplary embodiment, the target region is adjusted based on the distance. However, both the synchronization signal and the target region may be adjusted based on the distance.

As described above, in the first to third exemplary embodiments, in the case of using a plurality of rolling shutter type image sensors, captured images can be synchronized with simplicity and accuracy. Further, in the first to third exemplary embodiments, image capturing is performed in the target region, which is a partial region of the entire effective region in each of the image sensors 111 and 121, leading to a reduction in the number of captured images to be transmitted and the amount of processing.

Other Exemplary Embodiments

In the above-described exemplary embodiments, an HMD is exemplified. However, examples of apparatuses including a plurality of images sensors include various kinds of apparatuses, such as an on-vehicle camera, a ranging camera, a camera for obtaining a three-dimensional appearance, and an omnidirectional camera, other than the HMD. Further, the exemplary embodiments of the present disclosure can be applied to the various kinds of apparatuses described above, and the real-time synchronization of the plurality of sensors included in the various kinds of apparatuses can be achieved. In addition, the present disclosure is applicable to, for example, a case where image capturing is performed in different regions within the image capturing angle of view of each of the plurality of image capturing units, i.e., an application in which different captured images acquired in target regions set in the respective image sensors are temporally synchronized.

The exemplary embodiments described above are merely examples of embodying the present disclosure, and should not be interpreted to limit the technical scope of the present disclosure. In other words, the present disclosure can be carried out in various forms without departing from the technical idea or principal features of the present disclosure.

According to the present disclosure, in a case where image capturing is performed by a plurality of imaging devices, captured images that are accurately synchronized can be acquired simply and efficiently.

Other Embodiments

Embodiment(s) of the present disclosure can also be realized by a computer of a system or apparatus that reads out and executes computer executable instructions (e.g., one or more programs) recorded on a storage medium (which may also be referred to more hilly as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-026499, filed Feb. 18, 2019, which is hereby incorporated by reference herein in its entirety.

What is claimed is:

1. An apparatus that controls a pair of imaging devices each of which includes an image sensor and captures an image, the apparatus comprising:
   one or more processors; and
   one or more memories coupled to the one or more processors, the one or more memories having stored thereon instructions which, when executed by the one or more processors, cause the apparatus to:
   obtain displacement information including an amount and a direction of displacement for the image sensor in each of the pair of imaging devices;
   determine, as a target region, an overlapping region between effective regions for respective image sensors of the pair of imaging devices, based on the displacement information and a specification of the imaging device;
   generate a pair of synchronization signals each indicating a timing of starting image capturing of the determined target region by each imaging device of the pair of imaging devices, the timing being determined so as to synchronize a pair of images respectively acquired from the pair of imaging devices, based on the displacement information, the specification, and the determined target region of the imaging device; and
   detect a distance from each of the pair of imaging devices to an object,
   wherein, in a case where the detected distance indicates that the object is located at a position closer to each of the pair of imaging devices than a certain reference point, the pair of synchronization signals are adjusted based on the distance.

2. An apparatus that controls a pair of imaging devices each of which includes an image sensor and captures an image, the apparatus comprising:
   one or more processors; and
   one or more memories coupled to the one or more processors, the one or more memories having stored thereon instructions which, when executed by the one or more processors, cause the apparatus to:
   obtain displacement information including an amount and a direction of displacement for the image sensor in each of the pair of imaging devices;
   determine, as a target region, an overlapping region between effective regions for respective image sensors of the pair of imaging devices, based on the displacement information and a specification of the imaging device;
   generate a synchronization signal indicating a timing of starting image capturing of the determined target region by each imaging device of the pair of imaging devices, the timing being determined so as to synchronize a pair of images respectively acquired from the pair of imaging devices, based on the displacement information, the specification, and the determined target region of the imaging device,
   wherein the pair of imaging devices is disposed so as to overlap each other image capturing regions of the pair of imaging devices in at least a partial region of an entire effective region of each of the pair of imaging devices, and
   wherein a region determined to be the target region in a region in which the image capturing regions of the pair of imaging devices overlap each other is changed based on the distance, for each of the pair of imaging devices.

3. The apparatus according to claim 1, wherein in a case where the detected distance indicates that the object is located at a position closer to each of the pair of imaging devices than a certain reference point, the target region is adjusted based on the distance.

4. The apparatus according to claim 1,
   wherein the pair of imaging devices is disposed so as to overlap each other image capturing regions of the plurality of imaging devices in at least a partial region of an entire effective region of each of the pair of imaging devices, and
   wherein a region in which the image capturing regions of the pair of imaging devices overlap each other is determined as the target region.

5. The apparatus according to claim 1,
   wherein a synchronization position is determined in each of the pair of imaging devices to synchronize timings of starting image capturing in the determined target regions in the pair of imaging devices, and
   wherein the synchronization signal is a signal for starting scanning from a pixel corresponding to the synchronization position in each of the pair of imaging devices.

6. The apparatus according to claim 1, wherein the target region is determined in each of the pair of imaging devices based on preliminarily set information.

7. The apparatus according to claim 6, wherein the preliminarily set information includes information about a mechanical structure and an assembly error of each of the pair of imaging devices.

8. The apparatus according to claim 6, wherein the synchronization signal is generated based on the preliminarily set information.

9. The apparatus according to claim 1, wherein the instructions, when executed by the one or more processors, further cause the apparatus to detect a displacement amount of a plurality of images captured by the pair of imaging devices,
   wherein the target region in each of the pair of imaging devices is determined based on the displacement amount.

10. The apparatus according to claim 9, wherein the synchronization signal for each of the pair of imaging devices is determined based on the displacement amount.

11. The apparatus according to claim 1, wherein the pair of imaging devices is included in a head-mounted display to perform stereoscopic image capturing.

12. A control method for an apparatus that controls a pair of imaging devices each of which includes an image sensor and captures an image, the control method comprising:
the apparatus comprising:
one or more processors; and
one or more memories coupled to the one or more processors, the one or more memories having stored thereon instructions executed by the one or more processors; and a direction of displacement for the image sensor in each of the pair of imaging devices;
determining, as a target region an overlapping region between effective regions for respective image sensors of the pair of imaging devices, based on the displacement information and a specification of the imaging device;
generate a pair of synchronization signals each indicating a timing of starting image capturing of the determined target region by each imaging device of the pair of imaging devices, the timing being determined so as to synchronize a pair of images respectively acquired from the pair of imaging devices, based on the displacement information, the specification, and the determined target region of the imaging device; and
detect a distance from each of the pair of imaging devices to an object,
wherein, in a case where the detected distance indicates that the object is located at a position closer to each of the pair of imaging devices than a certain reference point, the pair of synchronization signals are adjusted based on the distance.

13. A non-transitory computer-readable recording medium storing a program that causes a computer to function as an apparatus that controls a pair of imaging devices each of which includes an image sensor and captures an image, the apparatus comprising:
one or more processors; and
one or more memories coupled to the one or more processors, the one or more memories having stored thereon instructions which, when executed by the one or more processors, cause the apparatus to:
obtain displacement information including an amount and a direction of displacement for the image sensor in each of the pair of imaging devices;
determine, as a target region, an overlapping region between effective regions for respective image sensors of the pair of imaging devices, based on the displacement information and a specification of the imaging device;
generate a pair of synchronization signals each indicating a timing of starting image capturing of the determined target region by each imaging device of the pair of imaging devices, the timing being determined so as to synchronize a pair of images respectively acquired from the pair of imaging devices, based on the displacement information, the specification, and the determined target region of the imaging device; and
detect a distance from each of the pair of imaging devices to an object,
wherein, in a case where the detected distance indicates that the object is located at a position closer to each of the pair of imaging devices than a certain reference point, the pair of synchronization signals are adjusted based on the distance.

14. The apparatus according to claim 1, wherein each of the pair of imaging devices comprises a rolling shutter type image sensor.

* * * * *